(12) United States Patent
Liao

(10) Patent No.: US 11,320,716 B2
(45) Date of Patent: May 3, 2022

(54) DISPLAY ELECTRONIC DEVICE AND DRIVING METHOD HEREOF

(71) Applicant: Lenovo (Beijing) Co., Ltd., Beijing (CN)

(72) Inventor: Super Liao, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 24 days.

(21) Appl. No.: 15/926,173

(22) Filed: Mar. 20, 2018

(65) Prior Publication Data

US 2019/0101807 A1 Apr. 4, 2019

(30) Foreign Application Priority Data

Sep. 29, 2017 (CN) .......................... 201710903463.2

(51) Int. Cl.
| | |
|---|---|
| *G02B 26/08* | (2006.01) |
| *G02F 1/29* | (2006.01) |
| *G09G 3/00* | (2006.01) |
| *G02F 1/1343* | (2006.01) |
| *G09G 3/34* | (2006.01) |

(52) U.S. Cl.
CPC .............. *G02F 1/29* (2013.01); *G02F 1/1343* (2013.01); *G09G 3/007* (2013.01); *G09G 3/34* (2013.01); *G02F 1/291* (2021.01); *G09G 3/003* (2013.01); *G09G 2310/0264* (2013.01)

(58) Field of Classification Search
CPC .............. G02B 6/3518; G02B 26/0841; G02B 26/005; G02B 26/004; G02F 1/29; G02F 1/31; G02F 1/292; G02F 2001/291

USPC ................................................ 359/298–320
See application file for complete search history.

(56) References Cited

U.S. PATENT DOCUMENTS

| | | | |
|---|---|---|---|
| 10,056,437 B2 * | 8/2018 | Zhou ................... | H01L 51/5293 |
| 10,247,858 B2 * | 4/2019 | Shi ............................ | G02F 1/29 |
| 2014/0292732 A1 * | 10/2014 | Niioka ................... | G02B 27/22 |
| | | | 345/204 |
| 2016/0131918 A1 * | 5/2016 | Chu .................. | G02F 1/134309 |
| | | | 359/316 |
| 2017/0171540 A1 * | 6/2017 | Li .......................... | G02B 30/27 |
| 2019/0072805 A1 * | 3/2019 | Huang .................. | G02B 30/24 |

FOREIGN PATENT DOCUMENTS

| | | | | |
|---|---|---|---|---|
| CN | 1873472 | A | 12/2006 | |
| CN | 104297929 | A | 1/2015 | |
| CN | 104297994 | A | 1/2015 | |
| CN | 106385575 | A | 2/2017 | |
| CN | 109471256 | A * | 3/2019 | ........... G02F 1/0322 |
| JP | 2001174940 | A | 6/2001 | |
| WO | 2014058187 | A2 | 4/2014 | |

* cited by examiner

*Primary Examiner* — Mahidere S Sahle
(74) *Attorney, Agent, or Firm* — Anova Law Group, PLLC

(57) ABSTRACT

An electronic device includes a display panel and an optical deflector. The display panel irradiates an original light group corresponding to an original image displayed by the display panel and having a first resolution. The optical deflector receives the original light group and emits at least two output light groups having different transmission directions within a visual persistence duration. The at least two output light groups form an output image having a second resolution greater than the first resolution.

15 Claims, 8 Drawing Sheets

DISPLAY ELECTRONIC DEVICE AND DRIVING METHOD HEREOF

CROSS-REFERENCES TO RELATED APPLICATION

This application claims priority to Chinese Patent Application No. 201710903463.2, filed on Sep. 29, 2017, the entire contents of which are hereby incorporated by reference.

TECHNICAL FIELD

The present disclosure generally relates to the technical field of display technologies and, more particularly, to a display electronic device and a driving method thereof.

BACKGROUND

As the scientific technologies continue to develop, more and more electronic devices having a display function are widely used in people's daily life and work, which brings huge convenience. These electronic devices have now become important tools.

In an existing display electronic device, the image resolution relies on the resolution of the display panel. However, the resolution of the display panel further relies on the fabrication precision of the existing processing technologies, and the dimensions of the pixel units in the display panel cannot be further reduced. Thus, the resolution of the display panel cannot be further improved, which causes the resolution of the display electronic device to dissatisfy people's need for high-resolution display images.

BRIEF SUMMARY OF THE DISCLOSURE

In accordance with the disclosure, there is provided an electronic device including a display panel and an optical deflector. The display panel irradiates an original light group corresponding to an original image displayed by the display panel and having a first resolution. The optical deflector receives the original light group and emits at least two output light groups having different transmission directions within a visual persistence duration. The at least two output light groups form an output image having a second resolution greater than the first resolution.

Also in accordance with the disclosure, there is provided an electronic device including a display panel and an optical deflector. The display panel includes a pixel unit group. The pixel unit group includes a plurality of pixel units and opaque interstitials between adjacent pixel units. The pixel units emit light to form an original light group for displaying a first image at a first moment and a second image at a second moment. A time period between the first moment and the second moment is shorter than a visual persistence duration. The optical deflector allows the original light group to pass through without changing an irradiation angle of the original light group to form a first output light group at the first moment, and shifts the irradiation angle of the original light group to form a second output light group at a third moment between the first moment and the second moment. At least a portion of light of the second light group covers at least some regions of the interstitials.

Also in accordance with the disclosure, there is provided a driving method including acquiring a triggering command, and executing the triggering command to control an optical deflector to emit at least two output light groups having different transmission directions within a visual persistence duration based on an original light group emitted by a display panel. The original light group forms an original image having a first resolution, and the at least two light groups forms an output image having a second resolution greater than the first resolution.

Also in accordance with the disclosure, there is provided a driving method including acquiring a triggering command, and executing the triggering command to control an optical deflector to allow an original light group emitted by a plurality of pixel units of a display panel to pass through without changing an irradiation angle of the original light group at a first moment and shift the irradiation angle of the original light group to form a second output light group at a second moment. A time difference between the first moment and the second moment is shorter than a visual persistence duration. At least a portion of light of the second light group covers at least some regions of interstitials between the pixel units.

BRIEF DESCRIPTION OF THE DRAWINGS

In order to more clearly illustrate technical solutions in embodiments of the present disclosure, drawings for describing the embodiments are briefly introduced below. Obviously, the drawings described hereinafter are only some embodiments of the present disclosure, and it is possible for those ordinarily skilled in the art to derive other drawings from such drawings without creative effort.

DETAILED DESCRIPTION

Various solutions and features of the present disclosure will be described hereinafter with reference to the accompanying drawings. It should be understood that, various modifications may be made to the embodiments described below. Thus, the specification shall not be construed as limiting, but is to provide examples of the disclosed embodiments. Further, in the specification, descriptions of well-known structures and technologies are omitted to avoid obscuring concepts of the present disclosure.

Figure 1A:
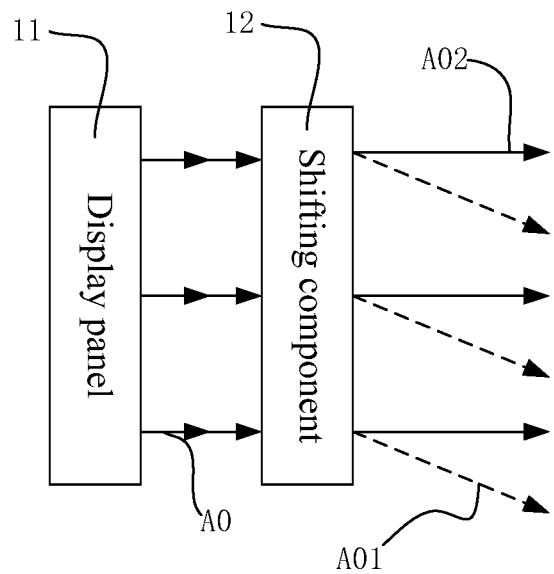
FIG. 1A is a schematic view of an example illustrating principles of image display of a display electronic device.

FIG. 1A is a schematic view of an example illustrating principles of image display of a display electronic device. As shown in FIG. 1A, the electronic device includes a display panel 11 and an optical deflector 12. The display panel 11 may emit a light group A0 to display an image, and may have a first resolution. The light group emitted by the display panel 11 may also be referred to as an "original light group." The optical deflector 12 may be located at a region irradiated by the light group A0 that is emitted by the display panel 11.

Further, the optical deflector 12 may be configured to, within a duration of visual persistence of a human eye (also referred to as a "visual persistence duration"), shift an irradiation angle of the light group A0 that corresponds to the image displayed by the display panel 11, thereby forming at least two light groups corresponding to the image. A light group emitted by the optical deflector 12 is also referred to as an "output light group." For example, the optical deflector 12 may form a first light group (also referred to as a "first output light group") A01 and a second light group (also referred to as a "second output light group") A02, where the first light group A01 has a same transmission direction as the light group A0.

Further, the at least two light groups formed by the optical deflector 12 may generate an image having an enhanced resolution with respect to the first resolution. That is, the at least two light groups corresponding to the image formed by the optical deflector 12 may enable an observer of the display panel 11 to sense the image with a second resolution, where the second resolution is greater than the first resolution. That is, the at least two light groups emitted by the optical deflector 12 may form an output image having the second resolution for the observer to observe.

When an object moves rapidly, even if the object observed by the human eye disappears, the human eye may still retain the image of the object for approximately 0.1 s-0.4 s, and this phenomenon is called visual persistence, which is a nature of the human eye. When the human eye observes the object, image is formed on the retina and is transmitted to human brain via the optic nerve, such that the human can sense the image of the object. However, when the object disappears, the impression of objection by the optic nerve does not disappear immediately, which remains for approximately 0.1 s-0.4 s. Such nature of the human eye is called "visual persistence," and the visual persistence duration may be, for example, approximately 0.1 s-0.4 s.

The present disclosure provides a display electronic device that utilizes the principles of "visual persistence." The disclosed display electronic device utilizes an optical deflector to rapidly change the irradiation angle of the light group corresponding to the image displayed by the display panel, thus forming at least two light groups corresponding to the image. Accordingly, the resolution of the image observed by the users is improved with respect to the resolution of the display panel. To satisfy the condition of visual persistence of the human eye, the time interval between the moments at which any two light groups from the at least two light groups that correspond to the image formed by the optical deflector 12 are respectively formed needs to be less than about 0.4 s, and the time interval between any two adjacent frames of image displayed by the display panel needs to be less than about 0.4 s.

Within the duration of visual persistence, the observer may sense the at least two light groups formed by the optical deflector 12 that correspond to the image at approximately the same time. Denote the aforementioned first resolution as P1 and the aforementioned second resolution as P2, through the technical solutions of the present disclosure, the image resolution sensed by the observer may increase from P1 to P2. Denote the number of the light groups formed by the optical deflector 12 corresponding to the image as N, then the relationship between P1 and P2 satisfies the following: $N*P1 \leq P2 \leq N^2*P1$.

In some embodiments, as shown FIG. 1A, within the duration of the visual persistence of human eye, the optical deflector 12, by shifting the irradiation angle of the light group A0 corresponding to the image displayed by the display panel 11, forms two light groups corresponding to the image, which are light group A01 and light group A02, respectively. That is, in the example shown in FIG. 1A, N=2, and the observer may sense the light group A01 and the light group A02 simultaneously within the duration of visual persistence. N may be any positive integer greater than 1, including but not limited to 2.

Figure 1B:
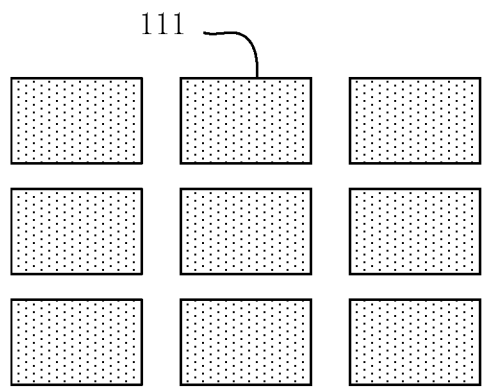
FIGS. 1B-1D are schematic views of examples illustrating principles of enhancing resolution of images sensed by an observer.
Figure 1C:
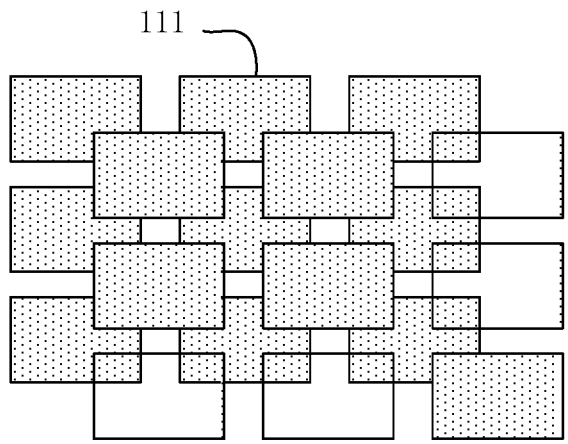
Figure 1D:
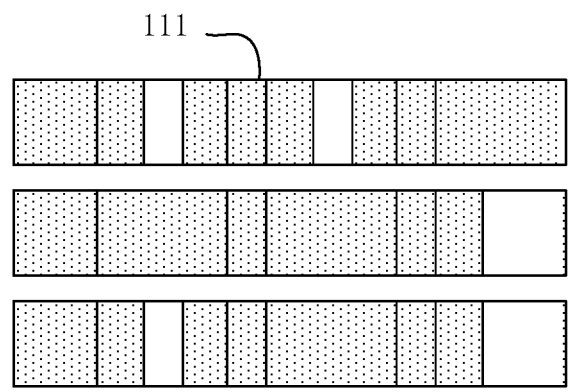

FIGS. 1B-1D are schematic views of examples illustrating principles of enhancing the resolution of images sensed by an observer, i.e., principles of using the optical deflector 12 to increase the resolution of the image sensed by the observer. A pixel unit group of a display panel may include a plurality of pixel units arranged in an array, having a first resolution of m*n, where m and n can be any positive integers greater than 1. In FIGS. 1B-1D, the values of m and n are set as m=n=3 for illustrative purposes.

When the pixel units display an image, the light group emitted by the pixel units is shown in FIG. 1B, where each pixel unit emits a corresponding light beam 111. Suppose N=2, FIG. 1C illustrates an example of relative positions of the two light groups formed by the optical deflector, where the deflection direction of one light group with respect to the other light group is parallel to the diagonal direction of the array of the pixel units, and the second resolution sensed by the observer is $2m*2n=2^2*m*n$. FIG. 1D illustrates another example of relative positions of the two light groups formed by the optical deflector, where the deflection direction of the two light groups is parallel to the row direction of the array of pixel units, and the second resolution sensed by the observer is $m*2n=2*m*n$.

In the disclosed display electronic device, the irradiation angle of the light group A0 emitted by the display panel 11 may be shifted through the optical deflector 12 to form at least two corresponding light groups that correspond to the image. Due to visual persistence of the human eye, the observer of the display panel 11 can see the image with the second resolution. As such, the resolution of the display electronic device may be improved without reducing the dimension of the pixel units in the display panel 11.

Figure 2:
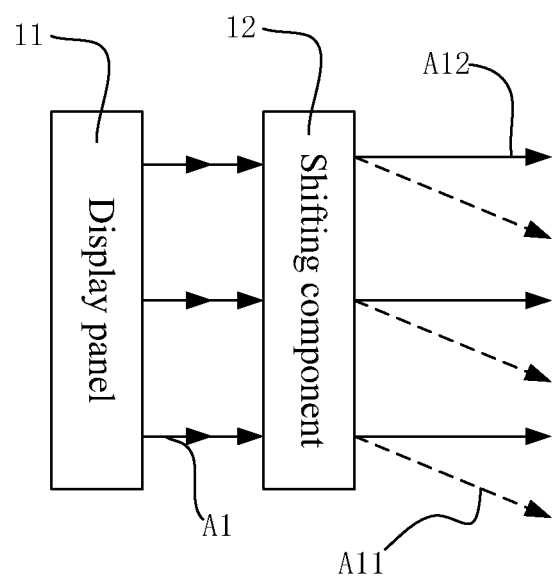
FIG. 2 is a schematic view of another example illustrating principles of image display of a display electronic device.

The display panel 11 may perform image display based on the display data, and may display a plurality of consecutive frames of images. Suppose the display panel 11 may display a first image at a first moment, and display a second image at a second moment, where the first image and the second image are two adjacent, e.g., consecutive, frames of images. The time difference between the first moment and the second moment needs to be less than the duration of the visual persistence of the human eye, such that the observer of the display panel 11 may see the first image and second image as continuous images. Suppose the first moment is prior to the second moment, the corresponding principles for the electronic device to perform image display is illustrated in FIG. 2.

In the disclosed display electronic device, for each frame of display image, within the duration of visual persistence, at least two light groups corresponding to the each frame of display image may be sensed by the observer through the optical deflector 12. Accordingly, the resolution of each frame of the display image sensed by the observer may be enhanced. That is, the first resolution may be increased to the second resolution. For example, when the first image is displayed, the observer may sense at least two light groups corresponding to the first image, and when the next frame, i.e., the second image, is displayed, the observer may sense at least two light groups corresponding to the second image. In other words, within the duration of visual persistence, for each frame of display image, at least two light groups corresponding to the frame of display image may be sensed by the observer.

Examples with N=2 are described above for illustrative purposes with reference to FIGS. 1B-1D. Similarly, when N=3, if the deflection direction is parallel to the row direction (or the column direction) of the array of pixel units, the second resolution is determined as P2=m*3n=3*m*n. It can be expected that, when N is any positive integer greater than 1, and plural light groups are formed by the optical deflector, the image resolution sensed by the observer may increase from P1 to P2, where $N*P1 \leq P2 \leq N^2*P1$.

For each frame of image displayed by the display panel, at least two light groups may be formed corresponding to the frame of image through the optical deflector to increase the resolution. For the light groups corresponding to any frame of image, when the optical deflector emits the light groups, the relative position of the next light group with respect to the previous light group may be shifted based on the preset deflection angle and direction, or may be shifted randomly.

Further, when the deflection direction of the light groups emitted by the optical deflector that correspond to the same image is given, the distance of deflection may be set to be smaller than the dimension of the pixel unit along the deflection direction, to prevent two light groups from completely overlapping each other. Optionally, the deflection distance may be configured to be equal to one half of the dimension of pixel unit along the deflection direction, thereby blocking more interstitial sites between the pixel units.

As shown in FIG. 1C, the deflection direction may be the diagonal direction of the array of the pixel units, and the dimension of the pixel unit along the deflection direction is the length of the diagonal of the pixel unit. If the deflection direction of two adjacent light groups is smaller than the length of the diagonal, the two adjacent light groups are at least partially overlapped, and the light group initially emitted by the display panel does not entirely overlap with the other light groups. As another example, as shown in FIG. 1D, when the deflection direction is the row direction of the array of pixel units, the dimension of a pixel unit along the deflection direction is the length of the pixel unit along the row direction. Because the deflection direction of two adjacent light groups is smaller than the length of the pixel unit along the row direction, the two adjacent light groups are at least partially overlapped, and the light group initially emitted by the display panel does not entirely overlap with other light groups.

When the optical deflector changes the irradiation angles of the light groups corresponding to each image, the parameters may be each time varied in the same way, i.e., the deflection direction and the distance may be configured to remain the same. In some other embodiments, the optical deflector may randomly change the irradiation angle, and under this situation, the deflection direction and angle of the light group may vary. Further, the process for the optical deflector to shift the light groups corresponding to each frame of image may be configured to be the same. That is, for each frame of image, the same procedure may be applied to change the irradiation angles of the light groups.

For any two adjacent frames of images displayed by the disclosed display panel, such as the aforementioned first image and second image, the time interval between the two adjacent frames of images (e.g., the first image and the second image) satisfies the condition of visual persistence. Correspondingly, the optical deflector varies the irradiation angel of the first light group at a moment between the first moment corresponding to the first image and the second moment corresponding to the second image. Thus, when at least two light groups corresponding to the first image are formed, the time interval corresponding to any two light groups emitted by the optical deflector that correspond to the first image shall satisfy the condition of the visual persistence of the human eye.

FIG. 2 is a schematic view of another example illustrating principles of image display of a display electronic device. As shown in FIG. 2, the display panel 11 may emit a light group A1 corresponding to a first image at a first moment. The optical deflector 12 may be configured to shift the irradiation angle of the light group A1 corresponding to the first image at a moment between the first moment and the second moment, thereby forming at least two light groups corresponding to the first image. The second moment may be a moment when the display panel 11 displays a second image. The at least two light groups corresponding to the first image formed by the optical deflector 12 may enable the observer of the display panel 11 to sense the first image with the second resolution.

In some embodiments, referring to FIG. 2, for any two adjacent frames of images, when the display panel 11 displays the first image, the optical deflector 12 may shift the irradiation angle of the light group A1 corresponding to the first image at a moment between the first moment and the second moment, and form at least two light groups corresponding to the first image. The observer may sense the at least two light groups corresponding to the first image formed by the optical deflector 12 simultaneously within the duration of the visual persistence. The second resolution is N times the first resolution, and N may be the number of light groups formed by the optical deflector 12 that correspond to the first image.

Further, in an example shown in FIG. 2, between the first moment and the second moment, the optical deflector 12 may shift the irradiation angle of the light group A1 corresponding to the first image displayed by the display panel 11, thus forming two light groups corresponding to the first image. Under this situation, N=2, and the two light groups corresponding to the first image may be a light group A11 and a light group A12, respectively. As such, the observer may sense the light group A11 and the light group A12 simultaneously within the duration of visual persistence. Similarly, N may be any positive integer greater than 1, including but not limited to 2.

Figure 3:
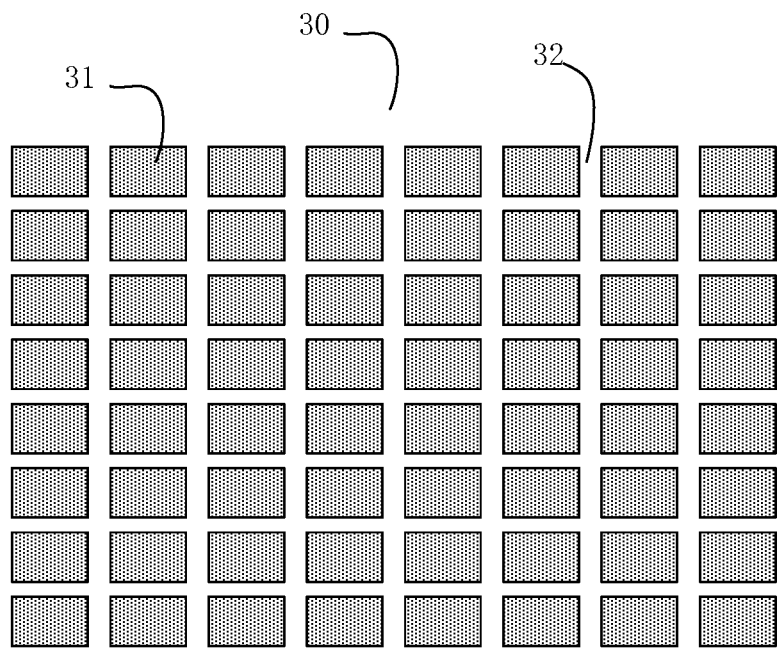
FIG. 3 illustrates a structural view of an example of a display panel.

FIG. 3 illustrates a structural view of an example of a display panel. As shown in FIG. 3, the display panel may include a pixel unit group 30 arranged in an array at a first resolution. The pixel unit group 30 includes a plurality of pixel units 31, and may be configured to emit light to form a light group. Between two adjacent pixel units 31 in the pixel unit group 30, there is an interstitial 32, which may be opaque. The at least two light groups corresponding to the first image formed by the optical deflector 12 may include a first light group at a first moment and a second light group at a third moment, where the third moment is between the first moment and the second moment. At least part of the light in the second light group may cover at least some regions of the interstitials 32. Thus, the optical deflector 12 is able to shield the interstitials 32 between the pixel units 31 of the display panel by changing the irradiation angle of the light group emitted by the display panel. Thus, the "screen-door effect" that occurs when the observer watches the display electronic device at a close distance may be avoided.

The display electronic device may have two working modes, i.e., a first working mode and a second working mode. Under the first working mode, the optical deflector is in a working status to change the irradiation angle of the light group corresponding to an image displayed by the display panel, thereby forming at least two light groups corresponding to the image. Under the second working mode, the optical deflector is in a non-working status, and the light group corresponding to the image displayed by the display panel may traverse the optical deflector directly, without the irradiation angle of the light group being changed.

When the display electronic device acquires a triggering signal, the working mode of the electronic device may be switched, such that the optical deflector may be configured in the first working mode or the second working mode. For example, the display electronic device may include at least one controller (e.g., one or more processors), and one processor may be configured to, based on a detection result, configure the optical deflector to be in the first working mode or the second working mode.

In some embodiments, a sensor may be configured on a display surface of the display electronic device, and the sensor may be configured to detect distance information between the display surface and the observer. For example, the sensor may be configured to detect the distance information between the display surface and a pair of glasses that the observer wears. The controller may determine whether the condition of the first working mode is satisfied based on the distance information. If the distance information indicates that the condition of the first working mode is satisfied, the controller may control the optical deflector to be in the first working mode. If the distance information indicates that the condition of the first working mode is not satisfied, the controller may control the optical deflector to be in the second working mode.

In some embodiments, if the distance information indicates that the distance between the display surface and the observer is smaller than a threshold, it can be determined that the condition of the first working mode is satisfied. If the distance information indicates that the distance between the display surface and the observer is greater than or equal to the threshold, it can be determined that the condition of the first working mode is not satisfied.

The controller may further detect whether the display electronic device is in a virtual scene image display status, and based on a detection result, start the first working mode or the second working mode. If the display electronic device is in a virtual reality (VR) operation mode or an augmented reality (AR) operation mode, the controller may control the optical deflector to be in the first working mode. If the display electronic device is not in a virtual reality (VR) operation mode or an augmented reality (AR) operation mode, the controller may control the optical deflector to be in the second working mode.

In some embodiments, whether the electronic device is in the virtual scene image display status may be determined by: detecting whether a VR or AR application program is started, or whether a VR or AR component is turned on, or whether a VR or AR component is connected, etc. That is, when a VR or AR application program is started, or a VR or AR component is started, or a VR or AR component is connected, the electronic device is determined to be in the virtual scene image display status.

The pixel unit group 30 may include M×N pixel units 31. That is, the first resolution may be M×N. In the example shown in FIG. 3, M=N=8. However, FIG. 3 is merely a schematic view of the display panel, and M and N can be any positive integers greater than 1, including 8 but not limited to 8.

The AR device or the VR device may represent a developing trend of the display electronic device. The AR device or the VR device requires the observer to watch the display image closely, which causes the observer to easily notice the "screen-door effect" of the display image caused by the interstitials 32 between the pixel units 31. That is, because the interstitials 32 are easily observed by the observer, grid-shaped shade may be formed in the display image, which affects the display effect of the image.

For example, a phone may be used as a display panel of the VR or AR device to be placed in a VR headset or AR headset for image display of a virtual scene. Under such situation, the observation distance of the phone may need to be reduced from 40 cm~1 m to less than 20 cm, which results in the issue of "screen-door effect" that can hardly be noticed by an observer at a remote distance.

The issue of "screen-door effect" is relatively apparent when the observer watches the AR device or VR device that displays an image at a close distance. When the display electronic device is an AR device and/or a VR device, the optical deflector 12 may shift the irradiation angle of the light emitted by the display panel that corresponds to an image displayed by the display panel, such that at least partial light of the second light group can cover at least some regions of the interstitials 32. Thus, the issue of "display-door effect" may be reduced or even avoided when the precision of visual resolution of the human eye is low.

Figure 4:
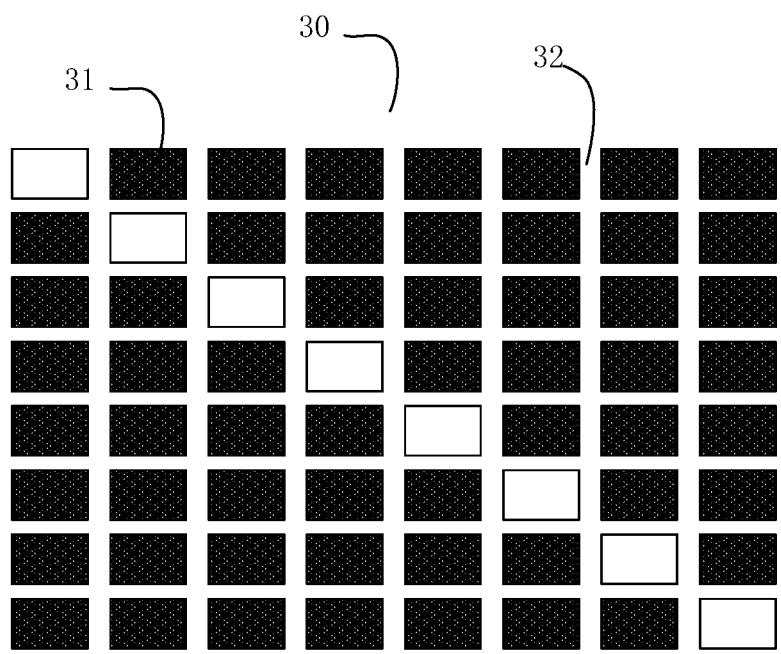
FIG. 4 is a schematic view illustrating principles for a display panel in FIG. 3 to display a first image at a first moment.
Figure 5:
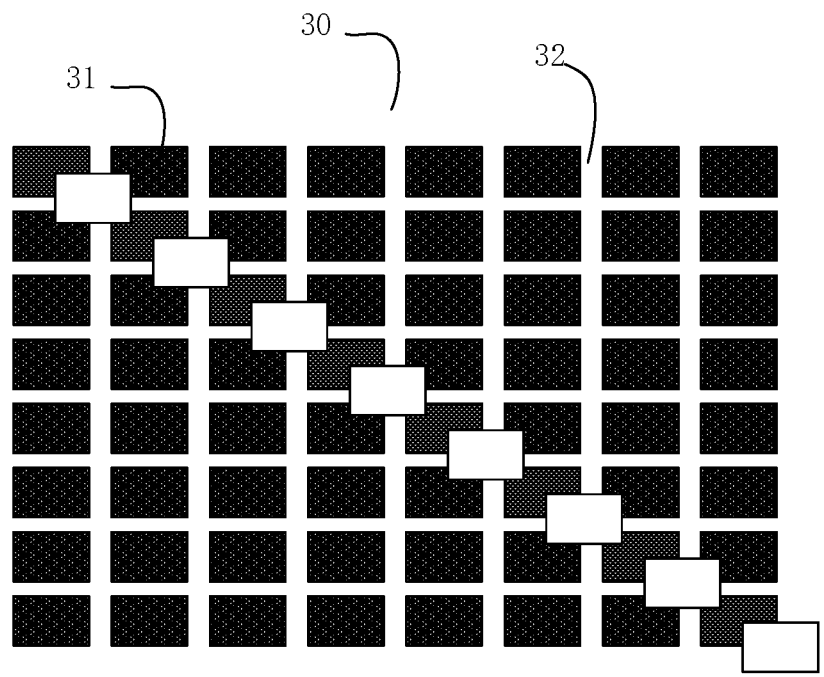
FIG. 5 is a schematic view illustrating principles for a display panel in FIG. 3 to display a first image at a third moment.
Figure 6:
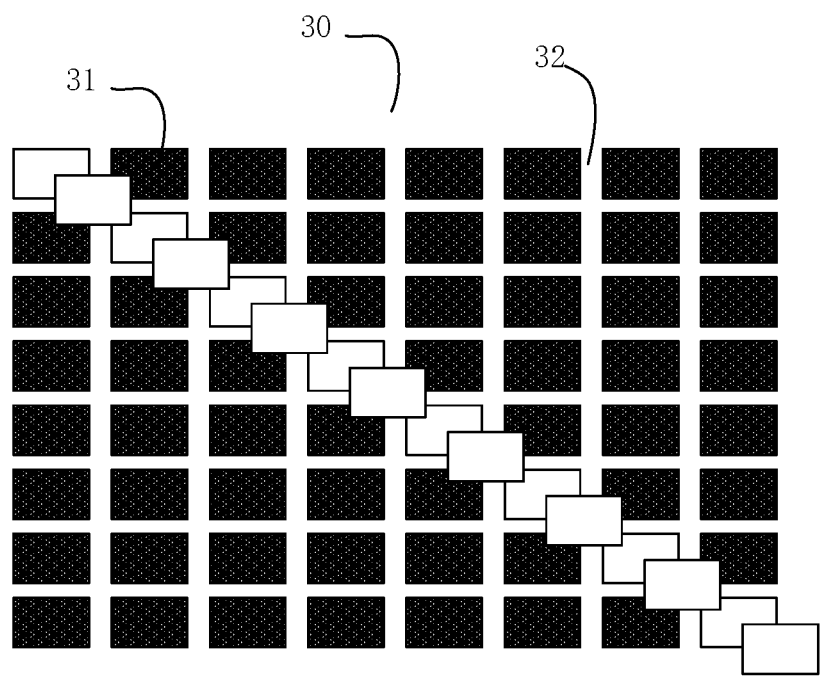
FIG. 6 is a schematic view illustrating principles of observing a first image displayed by a display panel in FIG. 3 that is actually observed by an observer.

The principles to overcome the "screen-door effect" are illustrated in FIGS. 4-6. FIG. 4 is a schematic view illustrating principles for the display panel in FIG. 3 to display a first image at the first moment. FIG. 5 is a schematic view illustrating principles for the display panel in FIG. 3 to display the first image at the third moment. FIG. 6 is a schematic view illustrating principles of observing the first image displayed by the display panel in FIG. 3 that is actually observed by an observer.

In some embodiments, as illustrated in FIG. 4, the first image includes a white-line image along the diagonal of the display region under the black display background. At the first moment, the transmission path of the first light group corresponding to the first image displayed by the display panel remains unchanged after passing through the optical deflector.

Referring to FIG. 5, at the first moment and the third moment, the display panel both displays the first image. Due to the function of the aforementioned optical deflector 12, the second light group may be deflected with respect to the first light group, and the deflection direction may be controlled by the aforementioned optical deflector 12. The optical deflector 12 may control the deflection direction to allow at least partial light in the second light group to cover at least some regions of the interstitials 32.

Referring to FIG. 6, because the time interval between the first moment and the third moment is shorter than the duration of visual persistence of the human eye, it is equivalent for the observer to see the first light group of the first image and the second light group of the first image simultaneously at the third moment. Thus, in the eye of the observer, the number of pixel units 31 observed by the observer becomes twice of the original number of pixel units 31 of the display panel. That is, the resolution sensed by the observer becomes the second solution, which is twice of the first resolution. Further, because the at least partial light in the second light group can cover the at least some regions of the interstitials 32, the "screen-door effect" caused by the interstitials 32 may be reduced.

To ensure that the second light group can cover at least some regions of the interstitials 32, the deflection dimension of the second light group with respect to the first light group may be smaller than the dimension of the pixel unit 31 along the deflection direction. To overcome the issue of "screen-door effect" to the maximum extent, the deflection direction of the second light group with respect to the first light group may be configured to be parallel to the diagonal direction of the display panel, and the deflection dimension may be configured to be smaller than the dimension of the pixel unit 31 along the diagonal.

Thus, the interstitials 32 between adjacent pixel units 31 in the same row may be covered, and the interstitials 32 between adjacent pixel units 31 in the same column may also be covered. The deflection direction may be another direction. For example, as the deflection may be a horizontal deflection (under this situation, only the interstitials 32 between adjacent pixel units 31 in the same row are covered) or a perpendicular deflection (under such situation, only the interstitials 32 between adjacent pixel units 31 in the same column are covered).

Further, the larger is the value of N, the more light groups are emitted by the optical deflector. By using the optical deflector to configure the irradiation angle of each light group, the number of interstitials 32 shielded by the pixel units 31 may be increased, and the effect of overcoming the "screen-door" issue may be improved.

The refraction status of the optical deflector 12 may be configured to be adjustable. For example, the optical deflector may have a first status at the first moment, and have a second status at a third moment. The refraction status of the optical deflector in the first status may be different from the refraction status of the optical deflector in the second status, such that the optical deflector may emit the first light group at the first moment and emit the second light group at the third moment.

Because the optical deflector have different refraction status in the first status and the second status, the refraction degrees of a light group that correspond to the image displayed by the display panel 11 are different when traversing the optical deflector in the first status and in the third status. Thus, the objective of changing the irradiation angle of the light group corresponding to the image displayed by the display panel 11 may be achieved.

Figure 7:
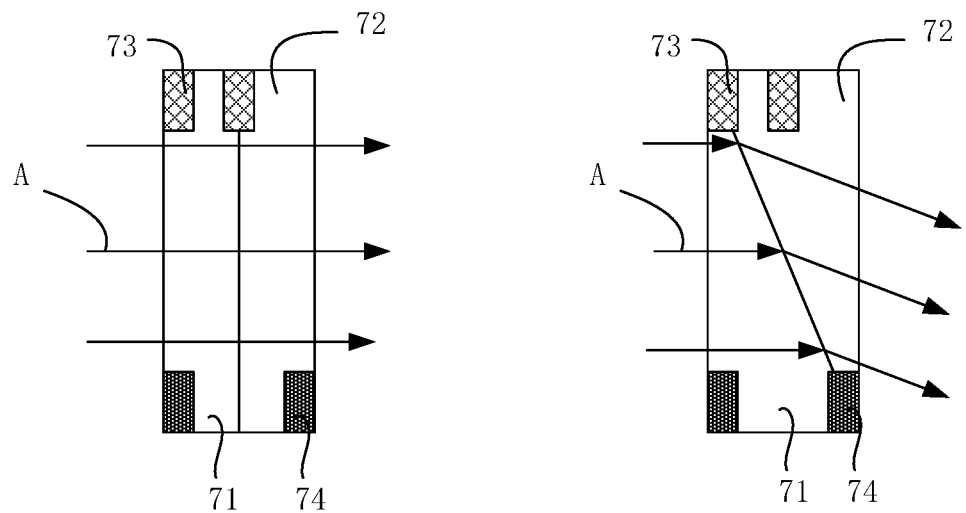
FIG. 7 illustrates a structural schematic view of an example of an optical deflector.

FIG. 7 illustrates a structural schematic view of an example of an optical deflector. In one embodiment, as shown in FIG. 7, the optical deflector includes a first material layer 71, a second material layer 72 stacked on the first material layer 71, one or more first electrodes 73, and one or more second electrodes 74. A light group A emitted by the display panel 11 may traverse the first material layer 71 and the second material layer 72, successively.

A control voltage may be applied at the one or more first electrodes 73 and the one or more second electrode 74, thereby shifting the electric field distribution between the one or more first electrodes 73 and the one or more second electrodes 74. Further, molecular distributions of the first material layer 71 and the second material layer 72 may be adjusted by the electric field, such that the optical deflector 12 may switch between the first status and the second status. For example, in FIG. 7, the left figure may represent the first status and the right figure may represent the second status, or vice versa. The first material layer 71 and the second material layer 72 may each include a liquid crystal material.

For example, the optical deflector 12 may include a first end and a second end relative to the first end. The direction from the first end to the second end may be perpendicular to the stacking direction of the first material layer and the second material layer. Referring to the left figure of FIG. 7, the stacking direction may be an initial state when no electric field is applied. That is, as shown in the left figure of FIG. 7, the stacking direction may be a horizontal direction, the first end may be the lower end of the left figure, and the second end may be the upper end of the left figure.

When no control voltage is applied at the one or more first electrodes 73 and the one or more second electrodes 74, the thickness of the first material layer 71 along the stacking direction remains unchanged, and the thickness of the second material layer 72 along the stacking direction remains unchanged, which corresponds to the first status, as shown in the left figure of FIG. 7. When a control voltage is applied at the one or more first electrodes 73 and the one or more second electrodes 74, the thickness of the second material layer 72 at around the first end decreases and the thickness of the second material layer 72 at around the second end increases, while the thickness of the first material layer 71 at around the first end increases and the thickness of the first material layer 71 at around the second end decreases, which corresponds to the second status. Thus, the objective of changing the irradiation angle of the light group A corresponding to the image displayed by the display panel 11 may be achieved.

Figure 8:
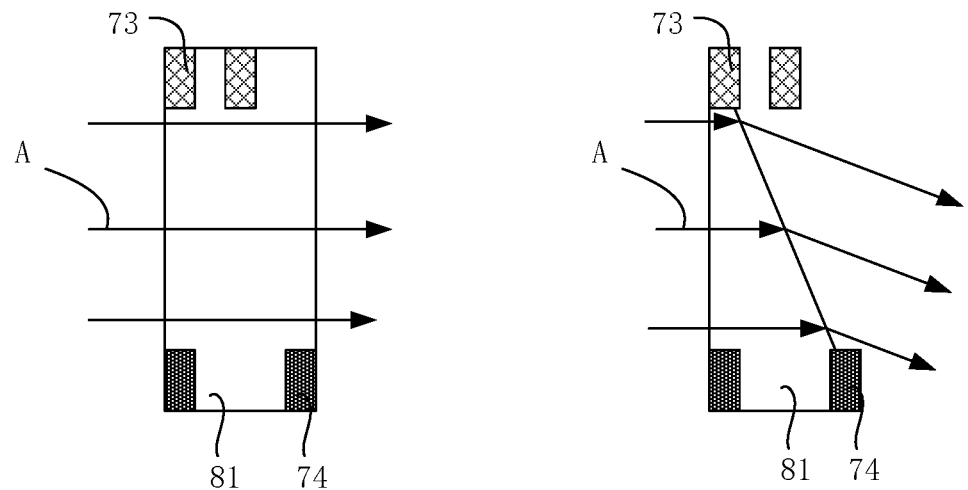
FIG. 8 illustrates a structural schematic view of another example of an optical deflector.

FIG. 8 illustrates a structural schematic view of another example of an optical deflector. In some embodiments, as shown in FIG. 8, the optical deflector includes a deformable material layer 81, one or more first electrodes 73, and one or more second electrodes 74. After passing through the deformable material layer 81, the light group A emitted by the display panel 11 may have different transmission paths based on the different statuses of the deformation material layer 81, such that the irradiation angle is varied.

Further, a control voltage may be applied at the one or more first electrodes 73 and the one or more second electrodes 74, thereby shifting the electric field distribution between the one or more first electrodes 73 and the one or more second electrodes 74. The molecular distribution of the deformable material layer 81 may be adjusted by the electric field, such that the optical deflector 12 may switch between the first status and the second status. In FIG. 8, the left figure and the right figure represent the first status and the second status, respectively. The deformable material layer 81 may be, for example, a liquid crystal material. The deformable material layer 81 may have different shapes in the first status and the second status, such that the optical path may be changed.

The deformable material layer 81 may be located between the one or more first electrodes 73 and the one or more second electrodes 74. For example, when no control voltage is applied at the one or more first electrodes 73 and the one or more second electrodes 74, the dimension of the deformable material layer 81 along a direction perpendicular to the transmission direction of the light group A may remain unchanged, which corresponds to the first status, as shown in the left figure of FIG. 8. When a control voltage is applied at the one or more first electrodes 73 and the one or more second electrodes 74, the thickness at the upper end of the deformable material layer 81 decreases, and the thickness at the lower end of the deformable material layer 81 increases, which corresponds to the second status. Thus, the objective of changing the irradiation angle of the light group A corresponding to the image displayed by the display panel 11 may be achieved.

Figure 9A:
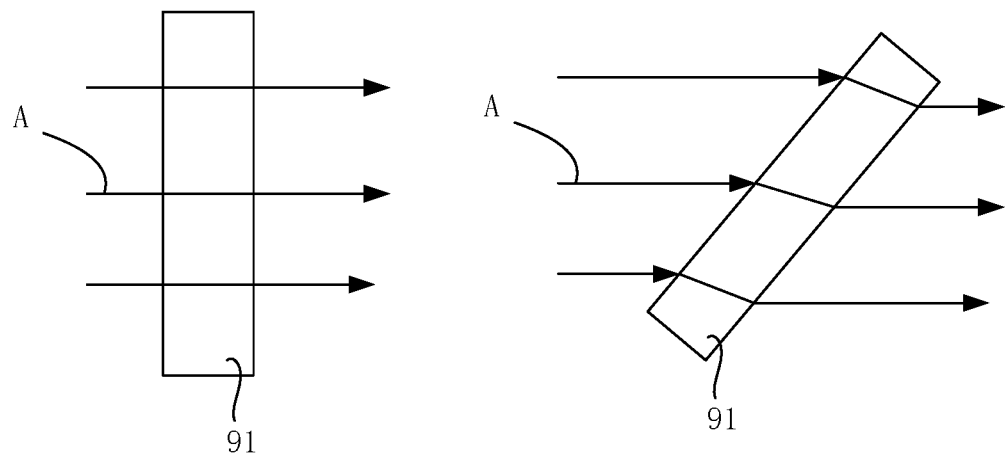
FIG. 9A illustrates a structural schematic view of another example of an optical deflector.

FIG. 9A illustrates a structural schematic view of another example of an optical deflector. In another embodiment, as shown in FIG. 9A, the optical deflector may include: a rotatory transparent element 91. The transparent element 91 may have a first status shown in the left figure of FIG. 9A, and a second status shown in the right figure of FIG. 9A. The transparent element 91 may be rotated automatically by a motor, or the transparent element 91 may be rotated manually. The transparent element 91 may be a transparent plate with a uniform thickness.

In the first status, the direction from the upper surface of the transparent element 91 to the lower surface of the transparent element 91 may be perpendicular to the irradiation direction of the light group A. In the second status, the transparent element 91 may have a none-zero angle with respect to the irradiation direction of the light group A. Because the transparent element 91 in the first status and the second status has different rotatory locations, the light group A may have different irradiation angles after passing through the transparent element 91.

Figure 9B:
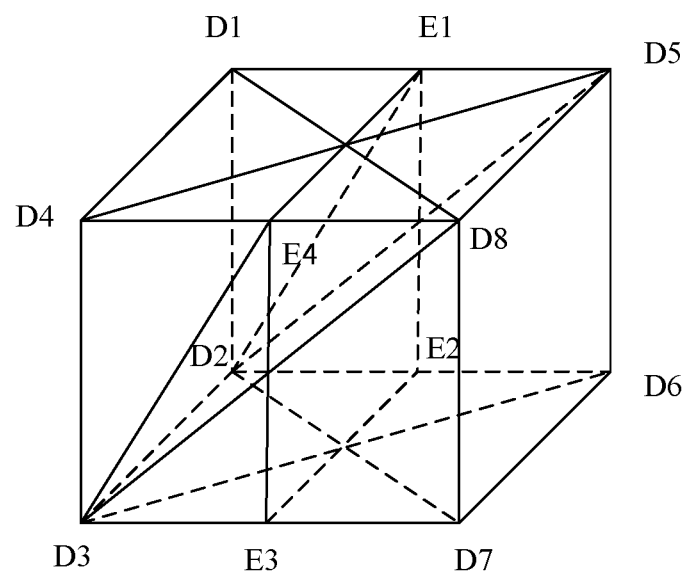
FIG. 9B illustrates a structural schematic view of another example of an optical deflector.

FIG. 9B illustrates a structural schematic view of another example of an optical deflector. The optical deflector may have an incident surface and an exit surface. The incident surface may face towards the display side of the display panel and be located at the irradiation region of the light group corresponding to the image displayed by the display panel. The exit surface may be configured to emit at least two light groups formed by the optical deflector that correspond to the image. In some embodiments, referring to FIG. 9B, the exit surface of the optical deflector may coincide with the D1D2D3D4 surface of the cubic D1D2D3D4D5D6D7D8. Further, the status of the exit surface of the optical deflector may be adjustable, and its relative position with respect to the incident surface may be changed, such that the optical deflector may have different refraction statuses. E1E2E3E is a midplane of the cubic D1D2D3D4D5D6D7D8.

In some embodiments, referring to FIG. 9B, if the exit surface is the surface D5D6D7D8, the light group that is incident normally on the incident surface D1D2D3D4 may be emitted from the exit surface D5D6D7D8 without the transmission path being deflected. That is, the light group that is incident normally on the surface D1D2D3D4 is emitted directly from the surface D5D6D7D8 without the irradiation angle being changed. Under this situation, the optical deflector may be configured to be in the first status.

In some embodiments, the exit surface may be surface D2D3D8D5, and the optical deflector may be in the second status when the exit surface is configured to be the surface D2D3D8D5. Under this situation, the light group that is incident normally on the surface D1D2D3D4 may be refracted inside the optical deflector and be emitted through the surface D2D3D8D5. Compared to the situation where the exit surface is configured to be surface D2D3E4E1, in the situation where the exit surface is set to be the surface D2D3D8D5, the deflection direction of the light group from the first status to the second status remains the same, but the deflection distance is different. That is, when the exit surface is the surface D2D3D8D5, the deflection distance is greater than that when the exit surface is the surface D2D3E4E1.

In some embodiments, the exit surface may be configured to be surface D1D2D7D8, and the optical deflector may be in the second status when the exit surface is the surface D1D2D7D8. The light group that is incident normally on the surface D1D2D3D4 may be refracted inside the optical deflector and be emitted from the surface D1D2D7D8. Compared to the situation where the exit surface is configured to be the surface D2D3D8D5, in the situation where the exit surface is the surface D1D2D7D8, the deflection direction of the light group from the first status to the second status is different, but the deflection distance remains the same. Further, with respect to the situation where the exit surface is configured to be the surface D2D3E4E1, when the exit surface is the surface D1D2D7D8, the deflection direction of the light group from the first status to the second status is different, and the deflection distance is also different.

As such, based on implementations illustrated in FIG. 9B, in the disclosed display electronic device, the relative position of the exit surface of the optical deflector with respect to the incident surface may be changed, thus changing the refraction index status of the optical deflector. The relative position of the exit surface with respect to the incident surface may include at least two positions, such that the optical deflector at least corresponds to two refraction index statuses.

For example, the number of relative positions of the exit surface with respect to the incident surface may be configured to be two. That is, there are two reflection index statuses of the optical deflector, which are the first status and the second status, respectively. By configuring a first electrode and a second electrode and changing the status of the optical deflector, the relative position of the exit surface with respect to the incident surface may be shifted.

Figure 10:
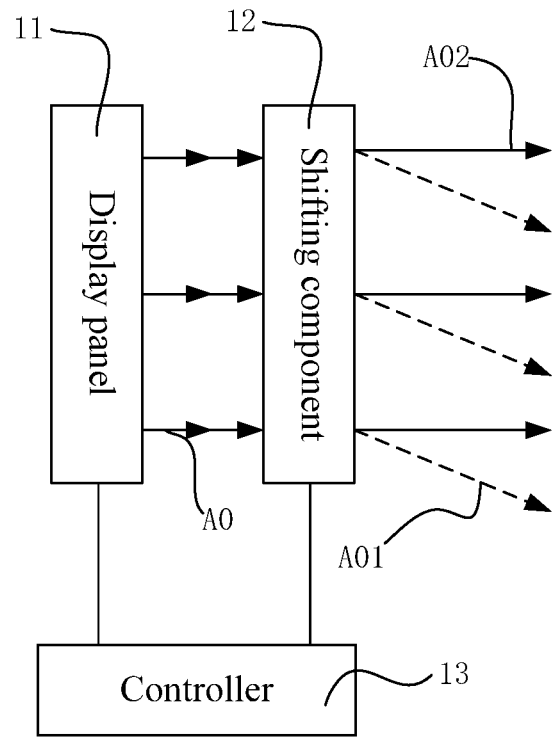
FIG. 10 illustrates a structural view of an example of a display electronic device.

FIG. 10 illustrates a structural view of an example of a display electronic device. As shown in FIG. 10, the display electronic device includes the display panel 11, the optical deflector 12, and a controller 13. The controller 13 may be configured to periodically shift the irradiation angle of the light group A0 corresponding to the image displayed by the display panel 11 through the optical deflector 12. Thus, the light group A0 emitted by the display panel 11 may switch between the transmission direction corresponding to the light group A01 and the transmission direction corresponding to the light group A02, such that the observer may see at least two light groups corresponding to the currently displayed image within the duration of visual persistence. The controller 13 may control the optical deflector 12 to perform the aforementioned shifting process through a corresponding clock control circuit.

The light group A01 in the at least two light groups corresponding to the image formed by the optical deflector 12 may have at least two relative position relationships with respect to the light group A02. The at least two relative position relationships may include a first relative position relationship and a second relative position relationship.

The controller 13 may be further configured to analyze the display data of the image displayed by the display panel 11, and select a target relative position relationship from the first relative position relationship and the second relative position relationship. Further, the controller 13 may, based on the target relative position relationship, control the deflection direction of a light group with respect to another light group through the optical deflector 12, thus enabling the effective resolution of the image having the second resolution to be greater than the effective resolution of the image having the first resolution. The effective resolution of the image may include a smoothness of the boundary of the image. By selecting a relative position relationship, the smoothness of the boundary of the image may be improved while the resolution is also enhanced.

As such, by configuring the optical deflector, the relative position of a light group with respect to another light group may be controlled. For example, for the display image illustrated in FIG. 4, the second light group may be deflected in the manner illustrated in FIG. 5. Under this situation, assume the first light group and the second light group have a first relative position relationship, the image actually sensed by the observer may be the one shown in FIG. 6. Accordingly, not only the resolution may be doubled, but also the "screen-door" effect may be overcome. Further, the effective resolution of the display image may be improved. That is, without changing the line-width of the white-line image, the sawtooth of the white line corresponding to the pixel units becomes smaller, and the line becomes smoother.

Figure 11:
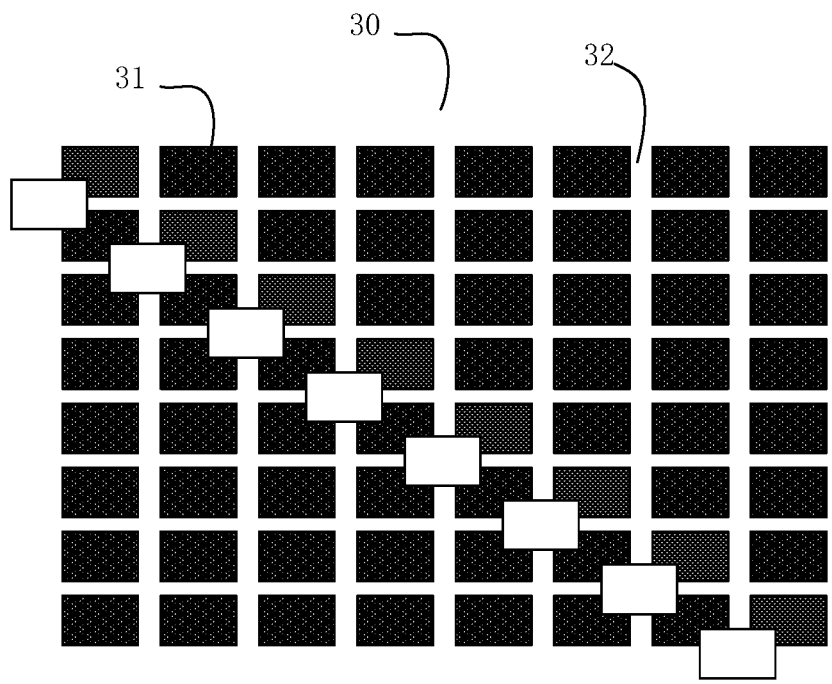
FIG. 11 is another schematic view illustrating principles of displaying a first image at a third moment by a display panel in FIG. 3.
Figure 12:
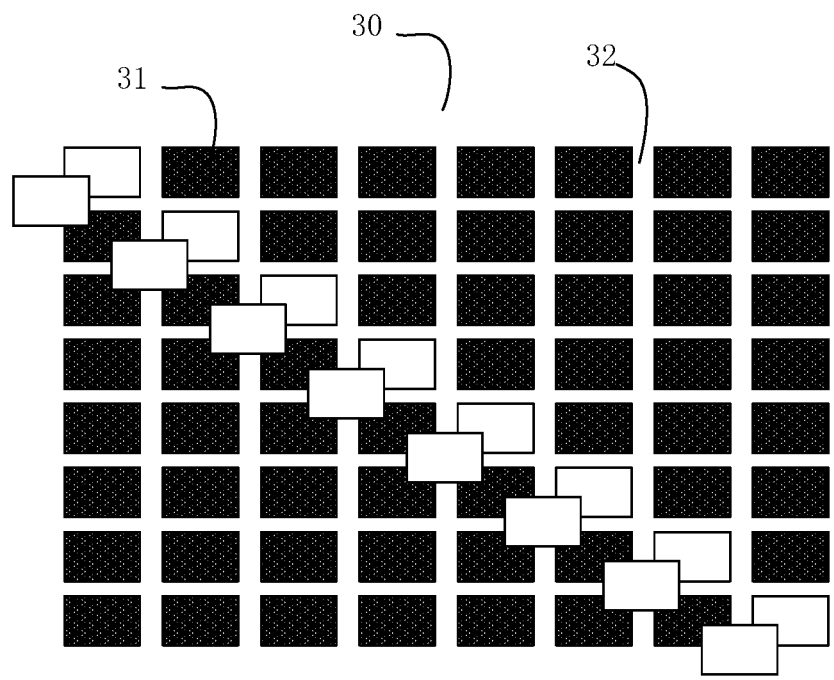
FIG. 12 illustrates a schematic view illustrating principles of observing another first image displayed by a display panel in FIG. 3 that is actually observed by an observer.

FIG. 11 is another schematic view illustrating principles of displaying the first image at the third moment by the display panel in FIG. 3. FIG. 12 illustrates a schematic view illustrating principles of observing another first image displayed by the display panel in FIG. 3 that is actually observed by an observer. For the display image illustrated in FIG. 4, if the second light group is deflected in the manner illustrated in FIG. 11, the first light group and the second light group may be referred to as having the second relative position relationship, and the image actually observed by the observer is shown in FIG. 12. As shown in FIG. 12, the resolution may be doubled, and the "screen-door" effect may be overcome.

As such, by shifting the irradiation angle through the optical deflector, the resolution (i.e., the effective resolution) of the cutting lines between different color regions of the image may be improved, thus making the cutting lines smoother. Accordingly, the image quality is improved.

From the aforementioned descriptions, in the disclosed display electronic device, the controller 13 may, by analyzing the display data of the display panel 11, select the target relative position of the second light group with respect to the first light group from the first relative position and the second relative position. Compared to other relative positions, the target relative position may allow the image sensed by the observer to have an improved effective image resolution. The effective image resolution includes but is not limited to the smoothness of the aforementioned image boundary. For example, the effective image resolution may further includes parameters related to displaying the screen-door, and the higher the effective image resolution is, the smaller the screen-door effect is.

The image displayed by the display panel 11 may include relatively rich image information, such that the effective image resolution may be improved to a relatively high extent. In some embodiments, the controller may be configured to, for various deflection directions, sum up the lengths of all image boundaries for each deflection direction, and select the deflection direction that shows a maximal sum as the deflection direction of the second light group with respect to the first light group, thereby determining the target relative position.

For example, a straight line parallel to the display surface of the display panel may be used as a reference line, and deflection directions are obtained every 1° within the range of 0°~179° (including 0° and 179°) with respect to the straight line. Thus, a total number of 180 deflection directions may be obtained. Further, the sum of the lengths of the image boundaries may be calculated for each of the 180 deflection directions to determine the target relative position.

In some other embodiments, the deflection direction can be determined by an approach different from that described above. For example, a deflection direction is defined every a° within the 0°~179° range (including 0° and 179°), where a is any value greater than 0 and smaller than 179. In some embodiments, a may be set to be 5° or 10°.

Figure 13:
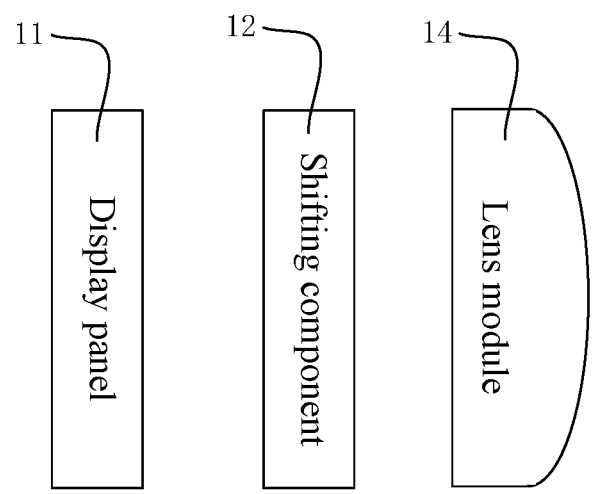
FIG. 13 illustrates a structural view of another example of a display electronic device.

FIG. 13 illustrates a structural view of another example of a display electronic device. As shown in FIG. 13, the electronic device includes the display panel 11, the optical deflector 12, and a lens module 14. The lens module 14 may be located within an irradiation range of the light group emitted by the optical deflector 12, and be configured to shift the imaging focus, thus facilitating the VR display or the AR display.

As described above, in the disclosed display electronic device, by shifting the irradiation angle of the light group emitted by the display panel 11 through the optical deflector 12, at least two light groups corresponding to the image may be formed. The at least two light groups may utilize the principles of visual persistence of the human eye to enable the observer of the display panel to watch the image with the second resolution.

That is, consistent with the disclosure, the resolution of the display electronic device can be increased without the need to decrease the dimension of the pixel units in the display panel. Further, by configuring the deflection direction and the dimension, the issue of "screen-door" may be overcome. Further, the effective resolution of the display image may be improved.

As such, based on the aforementioned embodiments, the present disclosure provides a display electronic device. The display electronic device may include a display panel having a pixel unit group and an optical deflector. An interstitial may exist between each two adjacent pixel units of the pixel unit group, and the interstitial may be opaque. The pixel unit group may be configured to emit light to form a light group, thus allowing the display panel to display an image.

Further, the display panel may display a first image at a first moment, and display a second image at a second moment. The first image and the second image are two adjacent frames of images. The time difference between the first moment and the second moment is less than the duration of the visual persistence. The optical deflector may be located in a region irradiated by a light group that is emitted by the display panel. The optical deflector may be configured to, within the duration of visual persistence of the human eye, shift the irradiation angle of the light group corresponding to the first image at a moment between the first moment and the second moment, thus forming at least two light groups corresponding to the first image.

The at least two light groups corresponding to the first image formed by the optical deflector may include a first light group at the first moment and a second light group at a third moment, where the third moment is between the first moment and the second moment. At least part of the light in the second light group may cover at least some regions of the interstitials.

The pixel unit group of the display panel includes a plurality of pixel units arranged in an array. The array of the pixel units may be located in a rectangular region, and the rectangular region may include two crossed diagonals—a first diagonal and a second diagonal. The deflection direction of the first light group with respect to the second light group may be configured to be parallel to the first diagonal or the second diagonal. When the deflection direction is set to be parallel to a diagonal of the pixel unit group, one light group of the two adjacent light groups may cover a relatively large region of the interstitials between pixel units corresponding to the other light group, thus overcoming the "screen-door" effect to a large extent.

As shown in FIG. 1C, by deflection along the diagonal, the interstitials between rows of the pixel units and the interstitials between columns of the pixel units may be shielded. That is, the area of the shielded interstitials can be relatively large. As shown in FIG. 1D, when deflection is performed along the row direction of the pixel units, only the interstitials between columns of the pixel units are shielded, and the area of the shielded interstitials is relatively small. Thus, according to some embodiments of the present disclosure, the deflection direction may be configured to be parallel to the diagonal direction, while in some other embodiments, the deflection direction may be a direction other than the diagonal direction.

In the disclosed display electronic device, the principles of using the optical deflector to shift the irradiation angle of the light group may be similar to the aforementioned embodiments, and are not repeatedly described herein. Similarly, the issue of "screen-door effect" can be effectively overcome, the image quality may be improved, and the resolution is enhanced.

Based on the aforementioned display electronic device, the present disclosure further provides a driving method. The driving method may be applied to the aforementioned display electronic device, and the driving method may include the followings.

At S11, a triggering command is acquired, where the triggering command is configured to trigger an optical deflector to shift an irradiation angle of a light group corresponding to an image displayed by a display panel.

At S12, the triggering command is executed, and the optical deflector is controlled to shift the irradiation angle of the light group corresponding to the image displayed by the display panel within a duration of visual persistence of human eyes, thereby forming at least two light groups corresponding to the image.

The at least two light groups corresponding to the image formed by the optical deflector may enable an observer of the display panel to watch the image with a second resolution. The second resolution is greater than the first resolution.

Based on the aforementioned display electronic device, in the disclosed driving method, shifting the irradiation angle of the light group may include: for each frame of image, when the optical deflector changes the irradiation angle of the light group, configuring the shifting parameters to be the same. That is, for each frame of image, the deflection direction and distance may be the same (i.e., the irradiation angle remains the same). Or, the optical deflector may be configured to change the irradiation angle randomly, and under this situation, the deflection direction and distance of the light group may not be the same for different frames of images. When the deflection direction of the light group emitted by the optical deflector corresponding to the same image is given, the distance of each deflection may be set to be smaller than the dimension of the pixel unit along the deflection direction to prevent two light groups from completely overlapping each other. Optionally, the deflection distance may be equal to one half of the dimension of pixel unit along the deflection direction, thereby shielding more interstitial sites between the pixel units.

The display electronic device may have two working modes, i.e., the first working mode and the second working mode. Under the first working mode, the optical deflector is in a working status to change the irradiation angle of the light group corresponding to the image displayed by the display image, thereby forming at least two light groups corresponding to the image. Under the second working mode, the optical deflector is in a non-working status, and the light group corresponding to the image displayed by the display panel may traverse the optical deflector directly, without the irradiation angle of the light group being changed.

Correspondingly, the driving method may further include: when configuring the display electronic device to acquire the triggering signal, performing a working mode switch, such that the optical deflector is configured in the first working mode or the second working mode.

For example, the display electronic device may include at least one controller, and a processor of the at least one controller may configure the optical deflector to be in the first working mode or the second working mode based on a detection result.

In some embodiments, a sensor may be configured on a display surface of the display electronic device, and the sensor may be configured to detect the distance information between the display surface and the observer. For example, the sensor may be configured to detect the distance information between the display surface and the pair of glasses that the observer wears. The controller may determine whether the condition of the first working mode is satisfied based on the distance information. If the distance information indicates that the condition of the first working mode is satisfied, the controller may control the optical deflector to be in the first working mode. If the distance information indicates that the condition of the first working mode is not satisfied, the controller may control the optical deflector to be in the second working mode.

In some embodiments, if the distance information indicates that the distance between the display surface and the observer is smaller than a threshold, it can be determined that the condition of the first working mode is satisfied. If the distance information indicates that the distance between the display surface and the observer is greater than or equal to the threshold, it can be determined that the condition of the first working mode is not satisfied.

The controller may further detect whether the display electronic device is in a virtual scene image display status, and based on a detection result, start the first working mode or the second working mode. If the display electronic device is in a virtual reality (VR) operation mode or an augmented reality (AR) operation mode, the controller may control the optical deflector to be in the first working mode. If the display electronic device is not in a virtual reality (VR) operation mode or an augmented reality (AR) operation mode, the controller may control the optical deflector to be in the second working mode.

In some embodiments, whether the electronic device is in the virtual scene image display status may be determined by:

detecting whether a VR or AR application program is started, or whether a VR or AR component is turned on, or whether a VR or AR component is connected, etc. That is, when a VR or AR application program is started, or a VR or AR component is started, or a VR or AR component is connected, the electronic device is determined to be in the virtual scene image display status.

The light group A01 from the at least two light groups corresponding to the image formed by the optical deflector 12 may have at least two relative position relationships with respect to another light group A02. The at least two relative position relationships may include a first relative position relationship and a second relative position relationship.

Correspondingly, based on the aforementioned embodiments of the display electronic device, in the disclosed driving method, shifting the irradiation angle of the light group may include: analyzing the display data of the image displayed by the display panel, selecting one of the first relative position relationship and the second relative position relationship as a target relative position relationship, and controlling the deflection direction of a light group with respect to another light group based on the target relative position relationship.

Accordingly, the effective resolution of the image having the second resolution may be greater than the effective resolution of the image having the first resolution. The effective resolution of the image may include a smoothness of the boundary of the image. By selecting the relative position relationship, the smoothness of the boundary of the image may be improved while the resolution is enhanced.

In the disclosed driving method, by controlling the optical deflector to shift the irradiation angle of the emergent light group, the resolution of the image sensed by the observer may be improved without changing the pixel dimension of the display panel. Such implementation is relatively simple, and the aforementioned display electronic device may be referred to for the specific controlling principles, which are not repeated here.

Based on the aforementioned display electronic device, the present disclosure further provides another driving method. The driving method may be applied to the aforementioned display electronic device, and the display panel of the display electronic device may include a pixel unit group. Interstitials may exist between adjacent pixel units of the pixel unit group, and the interstitials may be opaque. The pixel unit group may be configured to emit light to form a light group, thus allowing the display panel to display an image. The display panel may display a first image at a first moment, and display a second image at a second moment. The first image and the second image are two adjacent frames of images. The time difference between the first moment and the second moment is less than the duration of the visual persistence. The driving method may include the followings.

At S21, a triggering command is acquired, where the triggering command is configured to trigger an optical deflector to shift an irradiation angle of a light group corresponding to an image displayed by the display panel.

At S22, the triggering command is executed, the optical deflector is controlled to shift the irradiation angle of the light group corresponding to the first image displayed by the display panel within a duration of visual persistence of human eye and between the first moment and the second moment, thereby forming at least two light groups corresponding to the first image.

The at least two light groups corresponding to the first image formed by the optical deflector includes a first light group at the first moment and a second light group at a third moment, where the third moment is between the first moment and the second moment. At least part of the light in the second light group may cover at least some regions of the interstitials.

Based on the aforementioned display electronic device, in the disclosed driving method, shifting the irradiation angle of the light group may include: for each frame of image, when the optical deflector changes the irradiation angle of the light group, changing the same parameters to the same extent, such that the deflection direction and the distance may be the same. Or, the optical deflector may be configured to randomly change the irradiation angle, and under this situation, the deflection direction and the angle of the light group remain unchanged.

When the deflection direction of the light groups emitted by the optical deflector corresponding to the same image is given, the distance of each deflection may be set to be smaller than the dimension of the pixel unit along the deflection direction to prevent two light groups from completely overlapping each other. Optionally, the deflection distance is equal to half of the dimension of pixel unit along the deflection direction, to shield more interstitial sites of the pixel units.

The display electronic device may have two working modes, i.e., the first working mode and the second working mode. Under the first working mode, the optical deflector is in a working status to change the irradiation angle of the light group corresponding to the image displayed by the display image, thereby forming at least two light groups corresponding to the image. Under the second working mode, the optical deflector is in a non-working status. The light group corresponding to the image displayed by the display panel may traverse the optical deflector directly, without the irradiation angle of the light group being changed.

Correspondingly, the driving method may further include: when configuring the display electronic device to acquire the triggering signal, performing a working mode switch, such that the optical deflector switches between the first working mode and the second working mode.

For example, the display electronic device may include at least one controller, and a processor of the at least one controller may be configured to control the optical deflector to be in the first working mode or the second working mode based on a detection result.

In some embodiments, a sensor may be configured on a display surface of the display electronic device, and the sensor may be configured to detect the distance information between the display surface and the observer. For example, the sensor may be configured to detect the distance information between the display surface and the pair of glasses that the observer wears. The controller may determine whether the condition of the first working mode is satisfied based on the distance information. If the distance information indicates that the condition of the first working mode is satisfied, the controller may control the optical deflector to be in the first working mode. If the distance information indicates that the condition of the first working mode is not satisfied, the controller may control the optical deflector to be in the second working mode.

In some embodiments, if the distance information indicates that the distance between the display surface and the observer is smaller than a threshold, it can be determined that the condition of the first working mode is satisfied. If the distance information indicates that the distance between the display surface and the observer is greater than or equal to the threshold, it can be determined that the condition of the first working mode is not satisfied.

The controller may further detect whether the display electronic device is in a virtual scene image display status, and based on a detection result, start the first working mode or the second working mode. If the display electronic device is in a virtual reality (VR) operation mode or an augmented reality (AR) operation mode, the controller may control the optical deflector to be in the first working mode. If the display electronic device is not in a virtual reality (VR) operation mode or an augmented reality (AR) operation mode, the controller may control the optical deflector to be in the second working mode.

In some embodiments, whether the electronic device is in the virtual scene image display status may be determined by: detecting whether a VR or AR application program is started, or whether a VR or AR component is turned on, or whether a VR or AR component is connected, etc. That is, when a VR or AR application program is started, or a VR or AR component is started, or a VR or AR component is connected, the electronic device is determined to be in the virtual scene image display status.

The light group A01 from the at least two light groups corresponding to the image formed by the optical deflector 12 may have at least two relative position relationships with respect to another light group A02. The at least two relative position relationships may include a first relative position relationship and a second relative position relationship.

Correspondingly, based on the aforementioned embodiments of the display electronic device, in the disclosed driving method, shifting the irradiation angle of the light group may include: analyzing the display data of the image displayed by the display panel, selecting one of the first relative position relationship and the second relative position relationship as a target relative position relationship, and controlling the deflection direction of a light group with respect to another light group based on the target relative position relationship.

Accordingly, the effective resolution of the image having the second resolution may be greater than the effective resolution of the image having the first resolution. The effective resolution of the image may include a smoothness of the boundary of the image. By selecting the relative position relationship, the smoothness of the boundary of the image may be improved while the resolution is enhanced.

In the disclosed driving method, by controlling the optical deflector to shift the irradiation angle of the emergent light group, the resolution of the image watched by the observer may be improved without deceasing the dimension of pixel units of the display panel. Such implementation is relatively simple, and the aforementioned display electronic device may be referred to for the specific controlling principles, which are not repeated here.

In the present disclosure, relational terms such as first, second are merely for differentiating one object or operation from another object or operation without necessarily requiring or indicating any actual relationship or sequence between such objects or operations. Further, terms of "comprising" and "including" or any other variations thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In examples provided by the present disclosure, the disclosed devices and methods may be implemented through other manners. Various embodiments in the specification are described in a progressive manner, and each embodiment highlights their difference from other embodiments, and the same or similar parts between each embodiment may refer to each other.

The aforementioned illustrations of the disclosed embodiments teach those skilled in the relevant art to implement or employ the present disclosure. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An electronic device comprising:
    a display panel, wherein the display panel, having a plurality of pixel units, irradiates light beams forming an original light group in one original direction corresponding to an original image displayed by the display panel and having a first resolution; and
    an optical deflector, commonly shared by all the light beams of the original light group and processing all the light beams in the same process at each moment, receives the original light group and emits at least two output light groups having different transmission directions within a visual persistence duration, the at least two output light groups including a first output light group which remains unchanged from the one original direction and a second output light group, a deflection dimension of the second output light group with respect to the first light group is smaller than a dimension of the pixel units, and the two output light groups forming an output image having a second resolution greater than the first resolution.

2. The electronic device according to claim 1, wherein:
    the original image is a first image displayed by the display panel at a first moment,
    the display panel displays a second image at a second moment,
    a time period between the first moment and the second moment is shorter than the visual persistence duration, and
    the optical deflector shifts an irradiation angle of the original light group corresponding to the first image at a moment between the first moment and the second moment to form at least one of the at least two output light groups.

3. The electronic device according to claim 2, wherein:
    the pixel unit group including:
        a plurality of pixel units that emit light to form the original light group, and
        interstitials between adjacent pixel units, the interstitials being opaque,
    the at least two output light groups include a first output light group emitted at the first moment and a second output light group emitted at a third moment between the first moment and the second moment, and
    at least a portion of light of the second light group shields at least some regions of the interstitials.

4. The electronic device according to claim 1, wherein:
a refraction status of the optical deflector is adjustable between a first status for emitting the first output light group and a second status for emitting the second output light group, the first status and the second status being different from each other.

5. The electronic device according to claim 4, wherein:
the optical deflector includes:
- a first material layer,
- a second material layer stacked on the first material layer along a stacking direction,
- a first electrode, and
- a second electrode, the optical deflector has a first end and a second end opposite to each other, a direction from the first end to the second end being approximately perpendicular to the stacking direction, the first status corresponds to a status with no control voltage applied at the first electrode and the second electrode, the second status corresponds to a status with a control voltage applied at the first electrode and the second electrode, and in response to the control voltage being applied at the first electrode and the second electrode:
- a thickness of the second material layer near the first end decreases and a thickness of the second material layer near the second end increases, and
- a thickness of the first material layer near the first end increases and a thickness of the first material layer near the second end decreases.

6. The electronic device according to claim 1, further comprising:
a controller, wherein the controller controls the optical deflector to shift an irradiation angle of the original light group to form the at least two output light groups having the different transmission directions.

7. The device according to claim 6, wherein the controller further:
- analyzes display data of the original image displayed by the display panel,
- determines a target relative position relationship for the at least two output light groups, and
- controls the optical deflector to deflect the original light group according to the target relative position relationship to form one of the at least two output light groups.

8. A driving method comprising:
acquiring a triggering command; and
executing the triggering command to control an optical deflector to emit at least two output light groups having different transmission directions within a visual persistence duration based on an original light group of light beams emitted by a display panel, having a plurality of pixel units, wherein:
the original light group forms an original image having a first resolution and in a one original direction,
the at least two output light groups includes a first output light group which remains unchanged from the one original direction and a second output light group, a deflection dimension of the second output light group with respect to the first light group is smaller than a dimension of the pixel units, and the two output light groups form an output image having a second resolution greater than the first resolution, and the optical deflection is common to all the light beams and processes all the light beams of the original light groups in the same process at each moment.

9. An electronic device comprising:
a display panel, wherein the display panel, having a plurality of pixel units, irradiates light beams forming an original light group corresponding to an original image displayed at a first moment by the display panel as a first image and having a first resolution; and an optical deflector, commonly shared by all the light beams of the original light group and processing all the light beans in the same process at each moment, receives the original light group and emits at least two output light groups having different transmission directions within a visual persistence duration, the at least two output light groups including a first output light group which remains unchanged from the one original direction and a second output light group, a deflection dimension of the second output light group with respect to the first light group is smaller than a dimension of the pixel units, and the two output light groups forming an output image as a second image at a second moment, wherein the second image having a second resolution greater than the first resolution.

10. The electronic device according to claim 9, wherein:
the optical deflector shifts an irradiation angle of the original light group corresponding to the first image at a moment between the first moment and the second moment to form at least one of the at least two output light groups.

11. The electronic device according to claim 10, wherein:
the display panel includes a pixel unit group including:
- a plurality of pixel units that emit light to form the original light group, and
- interstitials between adjacent pixel units, the interstitials being opaque, the at least two output light groups include a first output light group emitted at the first moment and a second output light group emitted at a third moment between the first moment and the second moment, and at least a portion of light of the second light group shields at least some regions of the interstitials.

12. The electronic device according to claim 9, wherein:
a refraction status of the optical deflector is adjustable between a first status for emitting the first output light group and a second status for emitting the second output light group, the first status and the second status being different from each other.

13. The electronic device according to claim 12, wherein:
the optical deflector includes:
- a first material layer,
- a second material layer stacked on the first material layer along a stacking direction,
- a first electrode, and
- a second electrode, the optical deflector has a first end and a second end opposite to each other, a direction from the first end to the second end being approximately perpendicular to the stacking direction, the first status corresponds to a status with no control voltage applied at the first electrode and the second electrode, the second status corresponds to a status with a control voltage applied at the first electrode and the second electrode, and in response to the control voltage being applied at the first electrode and the second electrode:

a thickness of the second material layer near the first end decreases and a thickness of the second material layer near the second end increases, and a thickness of the first material layer near the first end increases and a thickness of the first material layer near the second end decreases.

14. The electronic device according to claim 9, further comprising:

a controller, wherein the controller controls the optical deflector to shift an irradiation angle of the original light group to form the at least two output light groups having the different transmission directions.

15. The device according to claim 14, wherein the controller further:

analyzes display data of the original image displayed by the display panel, determines a target relative position relationship for the at least two output light groups, and controls the optical deflector to deflect the original light group according to the target relative position relationship to form one of the at least two output light groups.

* * * * *